(12) United States Patent
Kim et al.

(10) Patent No.: US 12,189,227 B2
(45) Date of Patent: Jan. 7, 2025

(54) DISPLAY DEVICE WITH REPAIRABLE TOUCH LINES

(71) Applicant: LG DISPLAY CO., LTD., Seoul (KR)

(72) Inventors: Dae-Hoon Kim, Paju-si (KR);
Hyung-Ho Ahn, Paju-si (KR);
Yeon-Ock Ha, Paju-si (KR);
Young-Hyun Kong, Paju-si (KR);
Han-Ui Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/384,901

(22) Filed: Oct. 30, 2023

(65) Prior Publication Data
US 2024/0219762 A1 Jul. 4, 2024

(30) Foreign Application Priority Data

Dec. 29, 2022 (KR) .................. 10-2022-0189494

(51) Int. Cl.
*G02F 1/1362* (2006.01)
*G02F 1/1333* (2006.01)
*G06F 3/041* (2006.01)

(52) U.S. Cl.
CPC .... *G02F 1/13338* (2013.01); *G02F 1/136259* (2013.01); *G02F 1/136286* (2013.01); *G06F 3/0412* (2013.01)

(58) Field of Classification Search
CPC ......... G06F 3/041–047; G02F 1/13338; G02F 1/136259
See application file for complete search history.

(56) References Cited

U.S. PATENT DOCUMENTS

| | | | |
|---|---|---|---|
| 9,996,192 B2* | 6/2018 | Lu | G06F 3/0418 |
| 10,296,138 B2* | 5/2019 | Xi | G06F 3/0418 |
| 2010/0188624 A1 | 7/2010 | Lee et al. | |
| 2016/0170560 A1 | 6/2016 | Zhan et al. | |
| 2017/0185223 A1* | 6/2017 | Lu | G06F 3/0412 |
| 2018/0182814 A1 | 6/2018 | Kim et al. | |
| 2021/0200362 A1 | 7/2021 | Cha et al. | |
| 2021/0357095 A1 | 11/2021 | Yoshida | |

FOREIGN PATENT DOCUMENTS

| | | |
|---|---|---|
| KR | 2012-0102948 A | 9/2012 |
| KR | 2016-0091178 A | 8/2016 |

OTHER PUBLICATIONS

Extended European Search Report dated Apr. 26, 2024 issued in Patent Application No. 23209019.1 (9 pages).

* cited by examiner

*Primary Examiner* — Gene W Lee
(74) *Attorney, Agent, or Firm* — POLSINELLI PC

(57) ABSTRACT

Aspects of the present disclosure are directed to a display device having a repairable touch line. In one aspect, a display device includes a display panel including a plurality of touch blocks each having a touch electrode; a dummy region at one side of the display panel; a plurality of touch lines connected to the plurality of touch blocks and configured to apply a touch signal to the plurality of touch blocks; a repair line in the dummy region; and a dummy pattern in the dummy region.

18 Claims, 7 Drawing Sheets

DISPLAY DEVICE WITH REPAIRABLE TOUCH LINES

CROSS-REFERENCE TO RELATED APPLICATIONS

The present application claims the priority benefit of Korean Patent Application No. 10-2022-0189494, filed in Republic of Korea on Dec. 29, 2022, which is hereby incorporated by reference herein in its entirety into the present application.

BACKGROUND

Background

The present disclosure relates to a display device, and more particularly, to a display device having a repairable touch line.

Description of the Related Art

A touch panel provides one input means for inputting commands, information, etc., in various display devices such as a liquid crystal display (LCD) device, an organic light emitting diode (OLED) display device, and an electrophoretic display device. This input means allows a user to input information into the device by contacting a display surface with a finger or a pen while looking at the display device.

The touch panel may have an add-on type where a touch panel is attached to an exterior of a display panel or an in-cell type where a touch panel is installed inside a display panel. Recently, in an attempt to reduce the thickness of portable terminals such as a smart phone, a tablet PC and a notebook computer, the demand for an in-cell type display device has increased.

However, since a touch line is disposed inside the display panel in the in-cell type display device, it is difficult to resolve deterioration as well as to find out a deterioration position when deterioration such as an electric disconnection or an electric shortage occurs in the touch panel.

SUMMARY

Aspects of the present disclosure are directed to a display device that substantially obviates one or more of the problems due to limitations and disadvantages of the related art.

For instance, aspects of the present disclosure provide a display device where a deteriorated touch line is capable of being repaired.

In one aspect, a display device includes a display panel including a plurality of touch blocks each having a touch electrode; a dummy region at one side of the display panel; a plurality of touch lines connected to the plurality of touch blocks and configured to apply a touch signal to the plurality of touch blocks; a repair line in the dummy region; and a dummy pattern in the dummy region.

In another aspect, at least one of the plurality of touch lines is repaired by an electric contact between one of the plurality of touch lines and the repair line, between the repair line and the dummy pattern, and between the dummy pattern and one of the plurality of touch blocks.

In another aspect, an opening is disposed in each of an overlap region of one of the plurality of touch lines and the repair line, an overlap region of the repair line and the dummy pattern, and an overlap region of the dummy pattern and one of the plurality of touch blocks, and an electric contact is disposed in the opening.

In another aspect, the display panel includes first and second substrates; a thin film transistor on the first substrate, the thin film transistor having a gate insulating layer on the dummy pattern; a first insulating layer on the thin film transistor; a second insulating layer on the first insulating layer; a pixel electrode and a common electrode on the second insulating layer; and a liquid crystal layer between the first and second substrates.

In another aspect, the plurality of touch lines and the dummy pattern are on the first insulating layer.

In another aspect, the opening is in the first insulating layer, and the plurality of touch lines and the dummy pattern extend to an inside of the opening.

In another aspect, the electric contact is formed by melting the gate insulating layer.

In another aspect, the dummy pattern has an electric floating state.

In another aspect, the display panel further includes a black matrix on the second substrate; and a color filter layer on the black matrix.

In another aspect, the display panel includes first and second substrates; a thin film transistor on the first substrate, the thin film transistor having a gate insulating layer on the dummy pattern; a first insulating layer on the thin film transistor; a color filter layer on the thin film transistor; a second insulating layer on the color filter layer; a third insulating layer on the second insulating layer; a pixel electrode and a common electrode on the third insulating layer; and a liquid crystal layer between the first and second substrates.

In another aspect, the plurality of touch lines and the dummy pattern are on the second insulating layer.

In another aspect, the opening is in the first insulating layer, the color filter layer and the second insulating layer, and the plurality of touch lines and the dummy pattern extend to an inside of the opening.

In another aspect, the electric contact is formed by melting the gate insulating layer.

In another aspect, the opening is in the color filter layer and the second insulating layer, and the plurality of touch lines and the dummy pattern extend to an inside of the opening.

In another aspect, the electric contact is formed by melting the gate insulating layer and the first insulating layer.

In another aspect, the opening is disposed in the first insulating layer and the color filter layer, and the plurality of touch lines and the dummy pattern extend to an inside of the opening.

In another aspect, the electric contact is formed by melting the gate insulating layer and the second insulating layer.

In another aspect, the color filter layer includes red, green and blue color filters.

In another aspect, two adjacent ones of the red, green and blue color filters overlap each other in a non-display area.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a display panel including a plurality of touch blocks each having a touch electrode; a dummy region at one side of the display panel; a plurality of touch lines connected to the plurality of touch blocks, respectively, and applying a touch signal to the plurality of touch blocks; a repair line disposed in the dummy region; and a dummy pattern in the dummy region.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
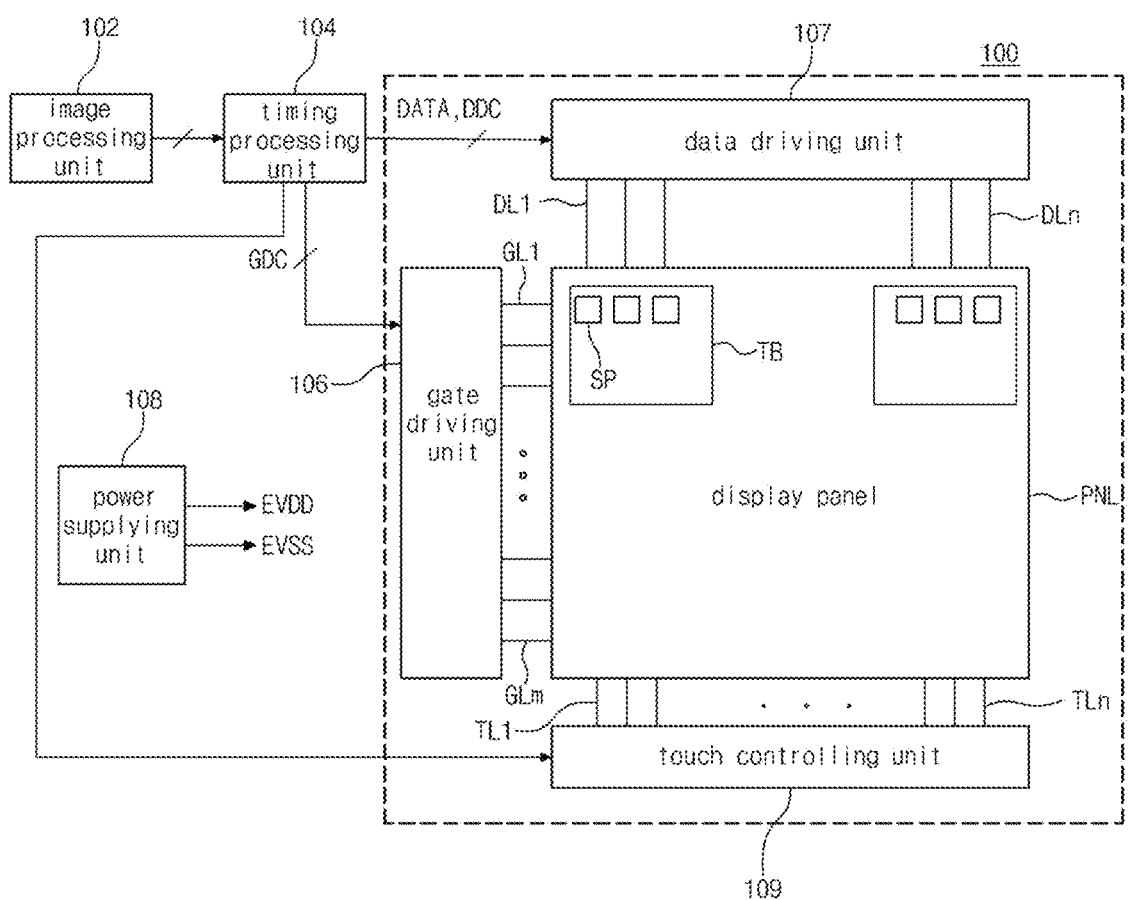
FIG. 1 is a view showing a display device according to some aspects of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below;" "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" may include a display device in a narrow sense such as liquid crystal module (LCM), an organic light emitting diode (OLED) module and a quantum dot (QD) module including a display panel and a driving unit for driving the display panel. In addition, the term "display device" may include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving unit may be expressed as "a display device", and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control unit for driving the display panel, and a set device may further include a set PCB of a set control unit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or an oxygen into the emitting element layer. In addition, a layer on the array may include an inorganic light emitting layer, for example, a nano-sized material layer or a quantum dot.

The thin film transistor of the present disclosure may include one of an oxide thin film transistor, an amorphous silicon thin film transistor, a low temperature polycrystalline silicon thin film transistor.

Features of various embodiments of the present disclosure may be partially or entirely coupled to or combined with each other. They may be linked and operated technically in various ways as those skilled in the art may sufficiently understand. The embodiments may be carried out independently of or in association with each other in various combinations.

Hereinafter, a display device according to various example embodiments of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings.

Figure 2:
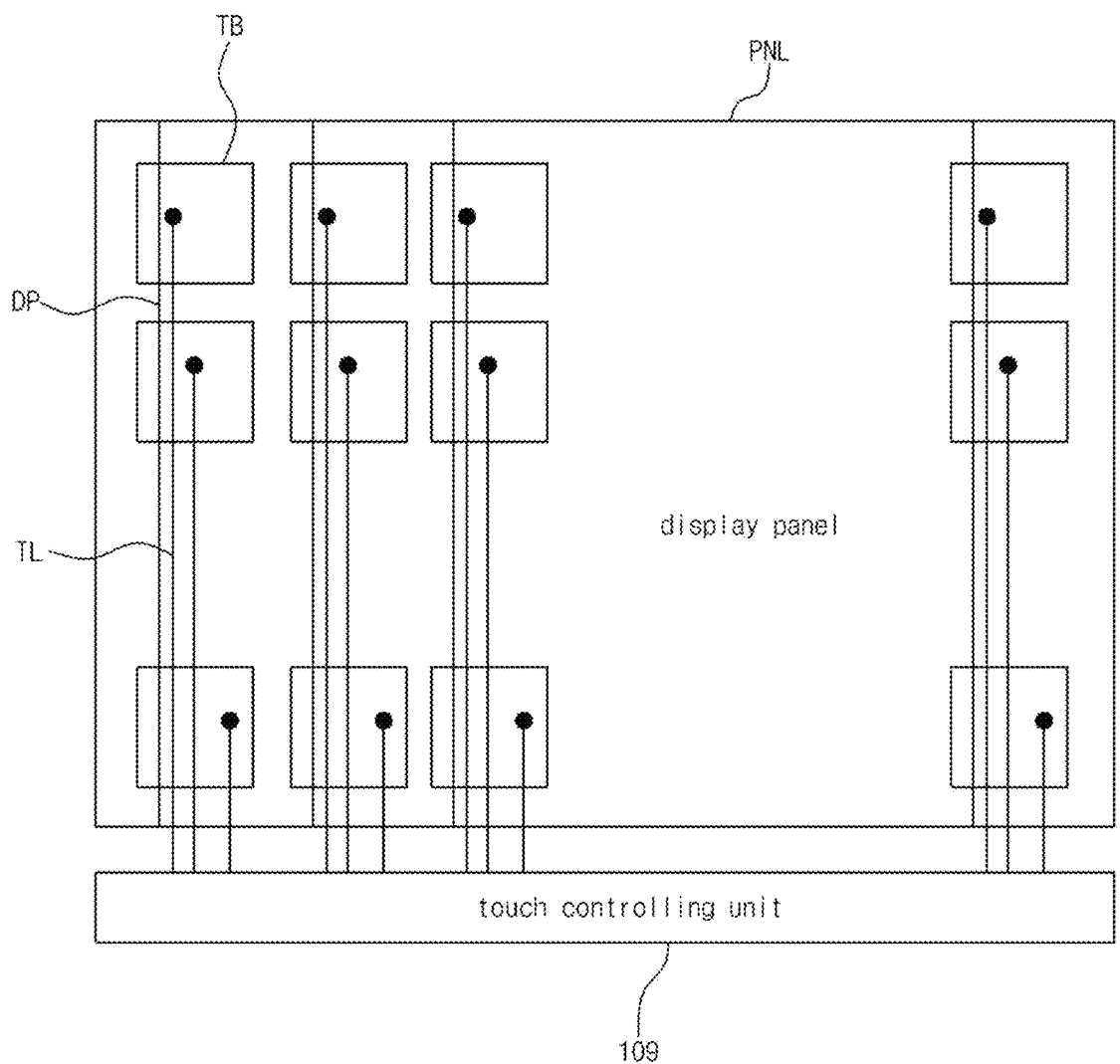
FIG. 2 is a view showing a display panel of a display device according to some aspects of the present disclosure.

FIG. 1 is a view showing a display device according to some aspects of the present disclosure, and FIG. 2 is a view showing a display panel of a display device according to some aspects of the present disclosure.

In FIG. 1, a display device 100 includes an image processing unit 102, a timing controlling unit 104, a gate driving unit 106, a data driving unit 107, a power supplying unit 108, a touch controlling unit 109 and a display panel PNL.

The image processing unit 102 outputs an image data supplied from an exterior and a driving signal for driving various units. For example, the driving signal outputted from the image processing unit 102 may include a data enable signal, a vertical synchronization signal, a horizontal synchronization signal and a clock signal.

The timing controlling unit 104 receives the image data and the driving signal from the image processing unit 102. The timing controlling unit 104 generates and outputs a gate control signal GDC for controlling a driving timing of the gate driving unit 106 and a data control signal DDC for controlling a driving timing of the data driving unit 107 based on the driving signal inputted from the image processing unit 102.

The gate driving unit 106 outputs a scan signal to the display panel PNL in response to the gate control signal GDC supplied from the timing controlling unit 104. The gate driving unit 106 transmits the scan signal to a plurality of gate lines GL1 to GLm of the display panel PNL. Although the gate driving unit 106 may be formed as an integrated circuit (IC), it is not limited thereto.

The data driving unit 107 outputs a data voltage to the display panel PNL in response to the data control signal DDC inputted from the timing controlling unit 104. The data driving unit 107 performs a sampling and a latch to the data signal DATA of a digital type supplied from the timing controlling unit 104 and converts the data signal DATA into the data voltage of an analog type based on a gamma voltage. The data driving unit 107 transmits the data voltage to a plurality of data lines DL1 to DLn of the display panel PNL. Although the data driving unit 107 may be formed as an integrated circuit (IC), it is not limited thereto.

The power supplying unit 108 outputs and supplies a high level voltage VDD and a low level voltage VSS to the display panel PNL. The high level voltage VDD is transmitted to a first power line EVDD of the display panel PNL, and the low level voltage VSS is transmitted to a second power line EVSS of the display panel PNL. A voltage outputted from the power supplying unit 108 may be outputted to the gate driving unit 106 and the data driving unit 107 to be used for driving the gate driving unit 106 and the data driving unit 107.

The touch controlling unit 109 may output a touch sensing signal for detecting a touch of a user to a plurality of touch electrodes of the display panel PNL according to a touch control signal TCS.

The display panel PNL displays an image using the scan signal of the gate driving unit 106, the data voltage from the data driving unit 107 and the high level voltage VDD and the low level voltage VSS from the power supplying unit 108.

The display panel PNL includes a plurality of subpixels SP to display an image. The plurality of subpixels SP may include a red subpixel, a green subpixel and a blue subpixel or a white subpixel, a red subpixel, a green subpixel and a blue subpixel. The white, red, green and blue subpixels may be formed to have the same area as each other or to have different areas from each other.

In FIG. 2, the display panel PNL includes a plurality of touch blocks TB. Each touch block TB is a unit touch sensor sensing a touch when a user touches the display panel PNL. One touch signal may be applied to each touch block TB and one touch may be detected by each touch block TB. The plurality of touch blocks TB may be formed as various numbers. For example, the display device of 86 inches may have the plurality of blocks of 44928. In the display device of 86 inches, the touch unit sensors of 44928 are disposed to form touch areas of 44928 sensing a touch throughout the entire display device. However, the plurality of touch blocks TB are not limited to a specific number and the number of the plurality of touch blocks TB may vary according to a condition such as an area, a resolution and an usage of the display device 100.

Each of the plurality of touch blocks TB is connected to the touch controlling unit 109 through a touch line TL, and the touch controlling unit 109 supplies the touch signal to each of the plurality of touch blocks TB.

A plurality of subpixels SP are disposed in each of the plurality of touch blocks TB. For example, although the plurality of subpixels SP of 40X14 may be disposed in one touch block TB of the display device of 86 inches, the disposition of the plurality of subpixels SP may be variously changed according to a kind of the display device 100.

Each of the plurality of touch blocks TB includes one touch electrode. The touch electrode of one touch block TB is electrically disconnected to the touch electrode of an adjacent touch block TB, and different touch signals are applied to the two adjacent touch blocks.

Since the plurality of subpixels SP (a subpixel group hereinafter) in each of the plurality of touch blocks TB commonly have the same touch electrode, the same touch signal is applied to the subpixel group. Since the touch line TL is disposed in each of the plurality of touch blocks TB, the subpixel group having the plurality of subpixels commonly has one touch line TL.

The touch controlling unit 109 may include a touch sensing element. The touch sensing element may be formed as an integrated circuit (IC) shape, and the touch line TL is electrically connected to the touch sensing element through a terminal of the touch sensing element.

The touch controlling unit 109 may include a plurality of touch sensing elements. Each of the plurality of touch sensing elements may be connected to the plurality of touch lines TL connected to the touch block TB of a corresponding column. For example, when the touch blocks are arranged in an n×m matrix shape, the touch sensing elements of m may be disposed in the touch controlling unit 109. However, the present disclosure is not limited thereto, and touch lines TL connected to the touch blocks TB of a plurality of columns may be connected to one touch sensing element.

Although the touch controlling unit 109 is disposed in a lower portion of the display panel PNL and the touch lines TL are connected to the touch controlling unit 109 in the lower portion of the display panel PNL in one aspect, the touch controlling units 109 may be disposed in upper and lower portions of the display panel PNL and the touch lines TL may be connected to the touch controlling units 109 in the upper and lower portions of the display panel PNL in another aspect. For example, the touch line TL connected to the touch blocks TB in an upper half of the display panel PNL may be connected to the touch controlling unit 109 in the upper portion of the display panel PNL and the touch line TL connected to the touch blocks TB in a lower half of the display panel PNL may be connected to the touch controlling u nit 109 in the lower portion of the display panel PNL.

A dummy pattern DP is disposed in the display panel PNL. Although the dummy pattern DP is disposed parallel to the touch line TL, the present disclosure is not limited thereto. One dummy pattern DP is disposed in each column of the touch blocks TB. For example, when the touch blocks are arranged in an n×m matrix shape, the dummy patterns DP of m may be disposed in the display panel PNL. The dummy pattern DP may be disposed to cross the touch block TB of the corresponding column.

The dummy pattern DP is a kind of redundancy line. When the touch line TL has a deterioration such as an electric disconnection or an electric shortage, the deterioration may be repaired by the dummy pattern DP. As a result, the dummy pattern DP may be referred to as a redundancy line or a repair line.

Figure 3A:
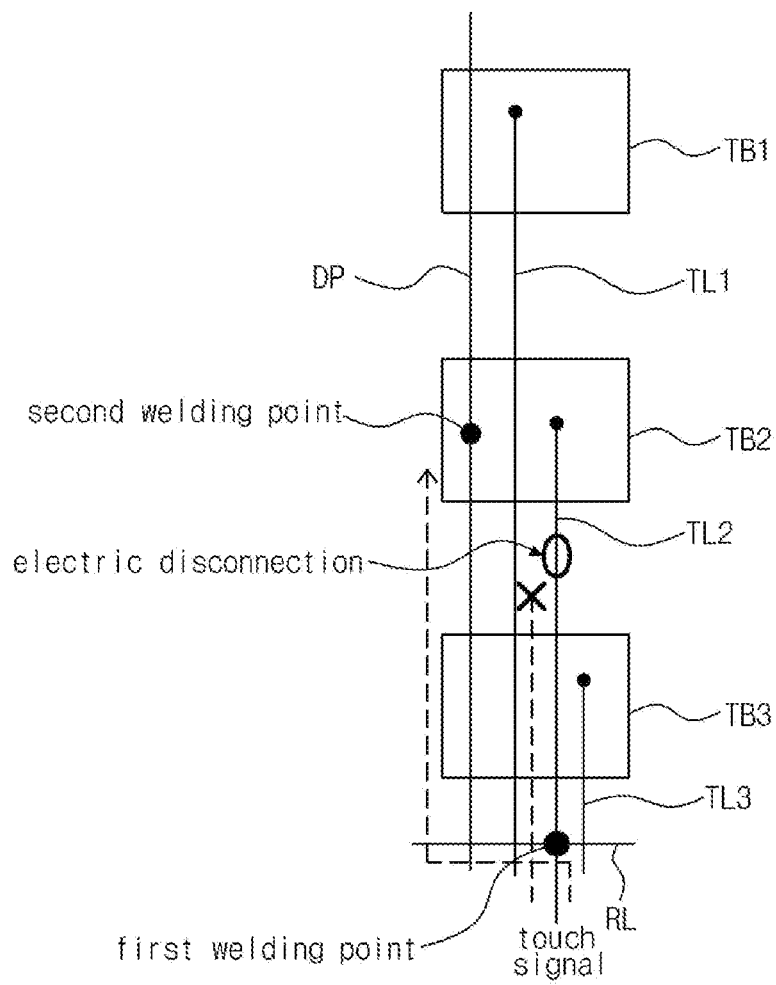
FIG. 3A is a view showing a repair process for a deterioration such as an electric disconnection of a display device according to some aspects of the present disclosure.
Figure 3B:
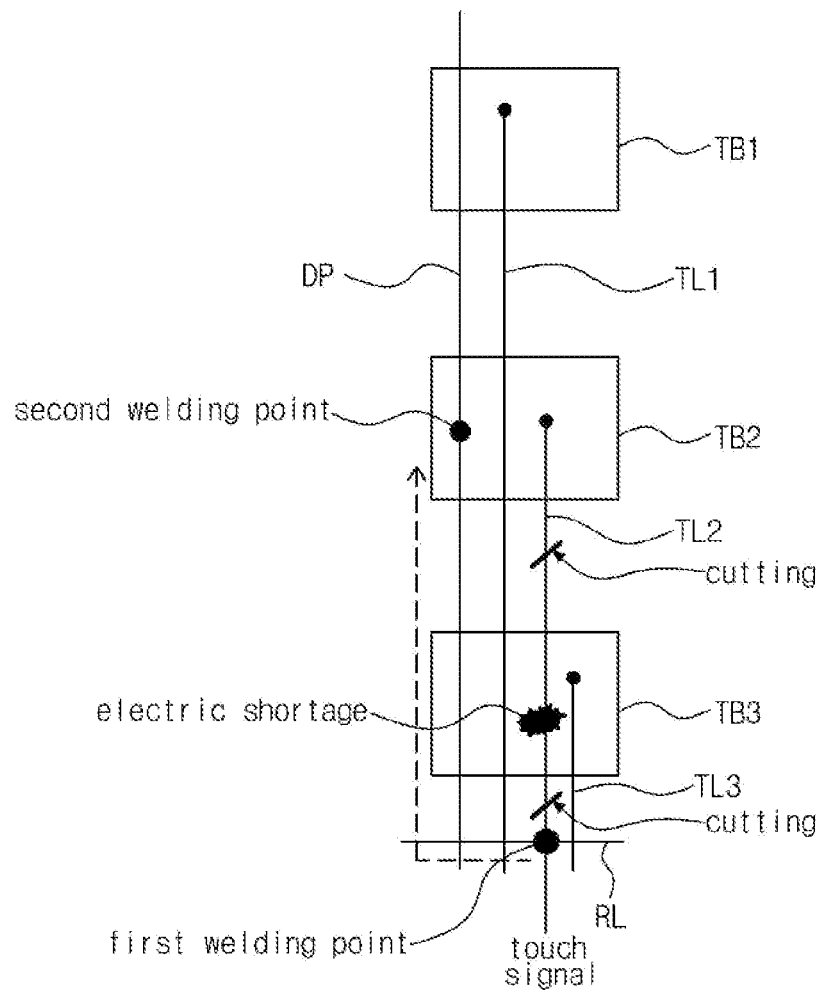
FIG. 3B is a view showing a repair process for a deterioration such as an electric shortage of a display device according to some aspects of the present disclosure.

FIGS. 3A and 3B are views showing a repair process for a deterioration such as an electric disconnection and an electric shortage, respectively, of a display device according to some aspects of the present disclosure. For illustration's convenience, one column having three touch blocks TB1, TB2 and TB3 are shown in FIGS. 3A and 3B.

In FIGS. 3A and 3B, the plurality of touch lines TL1, TL2 and TL3 are connected to the plurality of touch blocks TB1, TB2 and TB3, respectively, and a touch signal is applied to the plurality of touch blocks TB1, TB2 and TB3 in one column through the plurality of touch lines TL1, TL2 and TL3, respectively. The plurality of touch lines TL1, TL2 and TL3 are disposed along a vertical direction. One ends of the plurality of touch lines TL1, TL2 and TL3 are connected to the plurality of touch blocks TB1, TB2 and TB3, respectively, and the other ends of the plurality of touch lines TL1, TL2 and TL3 are connected to the touch controlling unit 109. Although the plurality of touch lines TL1, TL2 and TL3 are disposed along the vertical direction in some examples, the present disclosure is not limited thereto.

The dummy pattern DP is disposed in the plurality of touch blocks TB1, TB2 and TB3 in one column. Although the dummy pattern DP is disposed spaced apart from and parallel to the plurality of touch lines TL1, TL2 and TL3 in some examples, the present disclosure is not limited thereto. For example, the dummy pattern DP may be disposed to cross the plurality of touch lines TL1, TL2 and TL3 in another aspect.

The dummy pattern DP is disposed to overlap the plurality of touch blocks TB1, TB2 and TB3 in one column. Although the dummy pattern DP is disposed in a left side portion of the plurality of touch blocks TB1, TB2 and TB3 in some examples, the present disclosure is not limited thereto. For example, the dummy pattern DP may be disposed in a right side portion or a central portion of the plurality of touch blocks TB1, TB2 and TB3 in another example. The dummy pattern DP may be disposed at various positions.

A repair line RL is disposed in a lower portion of the display panel PNL. The repair line RL may be perpendicular to the dummy pattern DP to overlap the dummy pattern DP. Although the repair line RL is disposed in the lower portion of the display panel PNL in some examples, the repair line RL may be disposed in an upper portion of the display panel PNL or in upper and lower portions of the display panel PNL in other examples of the present disclosure.

The repair line RL is electrically insulated from a touch electrode of the plurality of touch blocks TB1, TB2 and TB3 and is electrically connected to the dummy pattern DP. In another aspect, the repair line RL and the dummy pattern DP may be electrically insulated from each other with an insulating layer interposed therebetween. The repair line RL may have a floating state where no signal is applied.

In FIG. 3A, when one of the plurality of touch lines TL1, TL2 and TL3, for example, a second touch line TL2 is electrically disconnected, the touch signal applied to a second touch block TB2 through the second touch line TL2 is blocked due to the electric disconnection. As a result, a touch deterioration such that a touch to the second touch block TB2 is not sensed occurs.

To prevent the touch deterioration, the touch signal may be applied to the second touch block TB2 through a detour path using the repair line RL by performing a repair process.

In the repair process, a laser beam is irradiated onto a first welding point where the second touch line TL2 and the repair line RL overlap each other to melt the second touch line TL2, the repair line RL and the insulating layer therebetween and to electrically connect the second touch line TL2 and the repair line RL. As a result, the touch signal applied to the second touch line TL2 is transmitted to the repair line RL and the dummy pattern DP electrically connected to the repair line RL.

Next, the laser beam is irradiated onto a second welding point where the second touch block TB2 and the dummy pattern DP overlap each other to electrically connect the dummy pattern DP and the touch electrode of the second touch block TB2. As a result, the touch signal of the dummy pattern DP is applied to the touch electrode of the second touch block TB2.

Due to the repair process, a new path through the second touch line TL2, the first welding point, the repair line RL, the dummy pattern DP and the second welding point is formed, and the touch signal applied to the second touch line TL2 is applied to the second touch block TB2 through the new path.

When the repair line RL and the dummy pattern DP is electrically insulated from each other, a welding step using a laser may be further required. For example, the laser beam may be irradiated onto a third welding point where the repair line RL and the dummy pattern DP overlap each other to melt the repair line RL, the dummy pattern DP and an insulating layer therebetween and to electrically connect the repair line RL and the dummy pattern DP.

Accordingly, a new path through the second touch line TL2, the first welding point, the repair line RL, the third welding point, the dummy pattern DP and the second welding point is formed, and the touch signal applied to the second touch line TL2 is applied to the second touch block TB2 through the new path.

In FIG. 3B, when one of the plurality of touch lines TL1, TL2 and TL3, for example, a second touch line TL2 connected to a second touch block TB2 is electrically shorted to the touch electrode of the first touch block TB1, the touch signal applied to the second touch block TB2 through the second touch line TL2 is transmitted to a third touch block TB3 as well as the second touch block TB2. As a result, a touch deterioration such that an accurate touch position is not sensed even when the second touch block TB2 is touched occurs.

To prevent the touch deterioration, the touch signal may be applied to the second touch block TB2 through a detour path using the repair line RL by performing a repair process.

In the repair process, a laser beam is irradiated onto front and rear points of a region where the second touch line TL2 and the first touch block TB1 are electrically shorted to cut the second touch line TL2. As a result, the touch signal applied to the third touch block TB3 is blocked, and it is blocked that a touch sensing signal sensed by the second touch block TB2 is transmitted to the touch controlling unit 109 through the second touch line TL2.

Next, the laser beam is irradiated onto a first welding point where the second touch line TL2 and the repair line RL overlap each other to melt the second touch line TL2, the repair line RL and the insulating layer therebetween and to electrically connect the second touch line TL2 and the repair line RL. As a result, the touch signal applied to the second touch line TL2 is transmitted to the repair line RL and the dummy pattern DP electrically connected to the repair line RL.

Next, the laser beam is irradiated onto a second welding point where the touch electrode of the second touch block TB2 and the dummy pattern DP overlap each other to electrically connect the dummy pattern DP and the touch electrode of the second touch block TB2. As a result, the touch signal of the dummy pattern DP is applied to the touch electrode of the second touch block TB2.

Due to the repair process, a new path through the second touch line TL2, the first welding point, the repair line RL, the dummy pattern DP and the second welding point is formed, and the touch signal applied to the second touch line TL2 is applied to the second touch block TB2 through the new path.

When the repair line RL and the dummy pattern DP is electrically insulated from each other, a welding step using a laser may be further required. For example, the laser beam may be irradiated onto a third welding point where the repair line RL and the dummy pattern DP overlap each other to melt the repair line RL, the dummy pattern DP and an insulating layer therebetween and to electrically connect the repair line RL and the dummy pattern DP.

Accordingly, a new path through the second touch line TL2, the first welding point, the repair line RL, the third welding point, the dummy pattern DP and the second welding point is formed, and the touch signal applied to the second touch line TL2 is applied to the second touch block TB2 through the new path.

In the display device according to some examples of the present disclosure, when the touch deterioration such as the electric disconnection or the electric shortage of the touch line TL occurs, the touch deterioration is repaired due to the new detour path.

Specifically, when the touch deterioration occurs after the dummy pattern DP is formed without change of a structure of the touch line TL or the touch block TB, the touch deterioration is repaired by electrically connecting the touch line TL and the dummy pattern DP. As a result, the repair process is simplified and the cost of the repair process is reduced or minimized.

Figure 4:
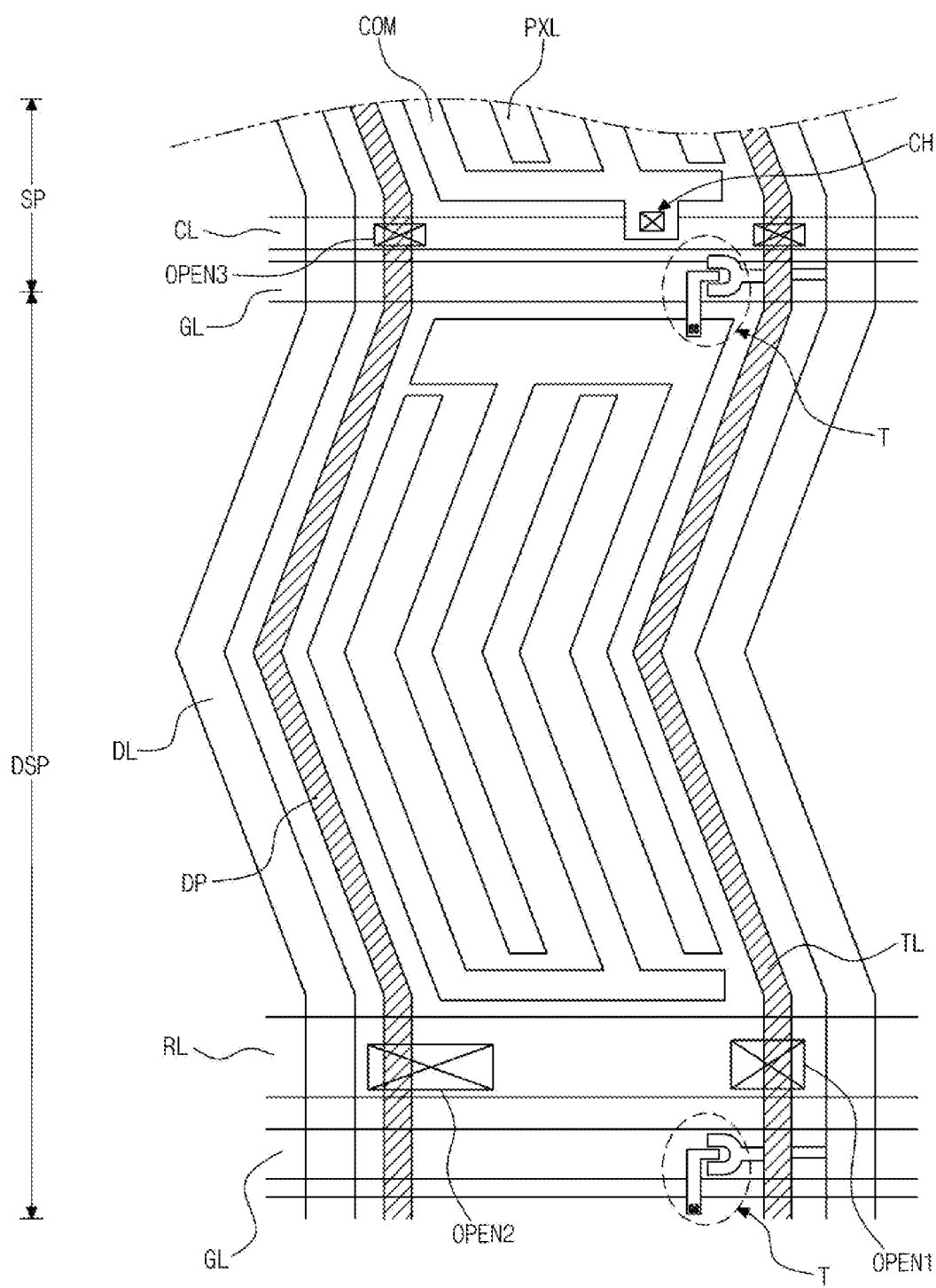
FIG. 4 is a plan view showing a display device according to some aspects of the present disclosure.

FIG. 4 is a plan view showing a display device according to some aspects of the present disclosure. For illustration's convenience, a dummy subpixel DSP, a repair line area where the repair line RL is disposed and a touch line area TLA (of FIG. 5) where the touch line TL is disposed are shown in FIG. 4.

In FIG. 4, a plurality of subpixels SP are defined by the plurality of data lines DL and the plurality of gate lines GL, and a dummy subpixel DSP is disposed in a lower portion (a dummy region) of the display device 100. A thin film transistor T, a pixel electrode PXL and a common electrode COM are disposed in each of the plurality of subpixels SP and the dummy subpixel DSP.

Although the display device 100 according to some aspects of the present disclosure is an in-plane switching (IPS) mode liquid crystal display (LCD) device where a pixel electrode PXL and a common electrode COM are disposed on the same plane and in parallel to each other and a lateral electric field parallel to a surface of a substrate is generated, the display device of the present disclosure is not limited to a specific mode LCD device. For example, the display device may be an LCD device of various modes such as a twisted nematic (TN) mode LCD device, a vertical alignment (VA) mode LCD device, a fringe field switching (FFS) mode LCD device.

The touch line TL and the dummy pattern DP may be disposed at both side portions of the subpixel SP and the dummy subpixel DSP. The touch line TL and the dummy pattern DP are disposed according to the touch block TB, and the plurality of subpixels SP are disposed in each touch block TB. As a result, the touch line TL and the dummy pattern DP may be disposed at both side portions of the one subpixel SP and the dummy subpixel DSP or may be disposed at one side portion of the other subpixel SP and the dummy subpixel DSP.

The touch line TL and the dummy pattern DP may be disposed parallel to the data line DL in the subpixel SP and the dummy subpixel DSP. Although the subpixel SP and the dummy subpixel DSP have a two-domain structure where the subpixel SP and the dummy subpixel DSP are symmetrically bent with respect to a central line and a viewing angle property is improved, it is not limited thereto.

The gate line GL and a common line CL are disposed in a lower portion of the subpixel SP. The gate line GL is connected to the thin film transistor T to apply a scan signal to the thin film transistor T. When the thin film transistor T is turned on by the scan signal, a data signal inputted through the data line DL is applied to the pixel electrode PXL through the thin film transistor T.

The common electrode COM disposed in the subpixel SP extends to the common line CL in the lower portion of the display device 100 to be connected to the common line CL through a contact hole CH, and a common voltage inputted to the common line CL from an exterior is applied to the common electrode COM.

A lateral electric field parallel to a surface of a substrate is generated in the subpixel SP due to a voltage difference between the data signal applied to the pixel electrode PXL (i.e., a pixel voltage) and the common voltage applied to the common electrode COM.

The dummy subpixel DSP is defined by the gate line GL and the data line DL, and the gate line GL and the data line DL are connected to the thin film transistor T. The pixel electrode PXL and the common electrode COM are disposed in the dummy subpixel DSP. Although the dummy subpixel DSP has the same structure as the subpixel SP where an image is displayed, an image is not displayed in the dummy subpixel DSP. The dummy subpixel DSP is disposed at an outermost portion of the subpixel SP to prevent reduction of a display quality due to a sudden structural change such as a step difference.

Although the pixel electrode PXL, the common electrode COM and the thin film transistor T are disposed in the dummy subpixel DSP, a signal is not applied to the pixel electrode PXL, the common electrode COM and the thin film transistor T. Although the pixel electrode PXL and the common electrode COM are disposed in the dummy subpixel DSP, a signal is not applied to the pixel electrode PXL, the common electrode COM and the thin film transistor T in the dummy subpixel DSP. Although the common electrode COM is electrically connected to the common line CL in the subpixel SP, the common electrode COM is electrically separated from the common line CL in the dummy subpixel DSP. As a result, the common voltage is not applied to the common electrode COM in the dummy subpixel DSP.

The common line CL in the dummy subpixel DSP functions as the repair line RL having an electric floating state. As a result, the repair line RL may be referred to as various words such as a dummy common line.

As shown in FIGS. 3A and 3B, when the touch line TL is electrically disconnected or electrically shorted, the touch line TL is repaired due to a detour path by the repair line RL and the dummy pattern DP. The touch line TL may be repaired by welding the touch line TL and the repair line RL at the first welding point and welding the repair line RL and the dummy pattern DP at the second welding point.

The welding of the touch line TL and the repair line RL and the welding of the repair line RL and the dummy pattern DP may be performed at a predetermined region and may be performed by irradiation of a laser. When the insulating layer between the touch line TL and the repair line RL and between the repair line RL and the dummy pattern DP has a relatively great thickness, it is substantially impossible to connect the touch line TL and the repair line RL or connect the repair line RL and the dummy pattern DP by melting the insulating layer with a laser.

As a result, a portion of the insulating layer in a welding region is removed to form first and second openings OPEN1 and OPEN2. The first and second openings OPEN1 and OPEN2 may be disposed in an overlap region of the touch line TL and the repair line RL and an overlap region of the repair line RL and the dummy pattern DP, respectively.

A third openings OPEN3 is disposed in the subpixel SP. The third opening OPEN3 is formed for welding the dummy pattern DP and the touch electrode of the touch block TB. When the touch line TL connected to the corresponding touch block TB is electrically disconnected or electrically shorted, the touch line TL and the repair line RL are electrically connected, and the dummy pattern DP and the touch electrode of the touch block TB are welded through the third opening OPEN3 by irradiating a laser beam. As a result, deterioration is repaired.

Since the third opening OPEN3 is used for welding the dummy pattern DP and the touch block TB, at least one third opening OPEN3 may be disposed in the touch block TB. To improve a possibility of the repair, a plurality of third openings OPEN3 may be disposed in the touch block TB.

Figure 5:
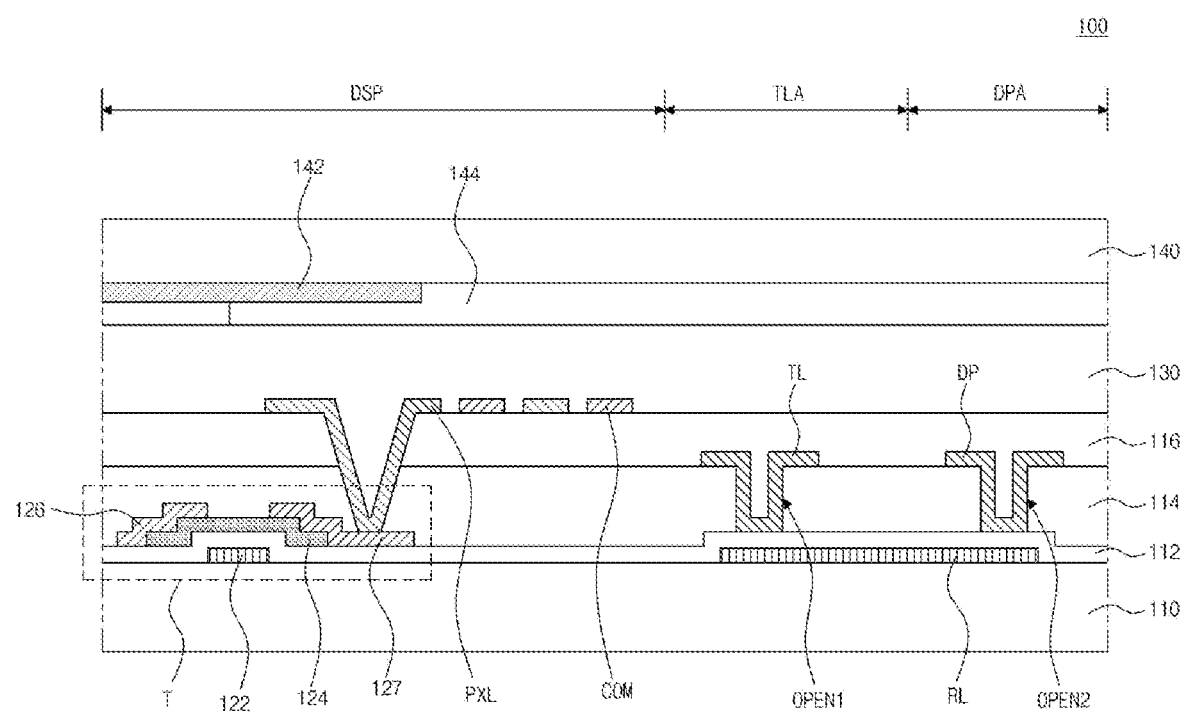
FIG. 5 is a cross-sectional view showing a display device according to some aspects of the present disclosure.

FIG. 5 is a cross-sectional view showing a display device according to some aspects of the present disclosure. For illustration's convenience, the dummy subpixel DSP, the touch line area TLA where the touch line TL is disposed and a dummy pattern area DPA where the dummy pattern DP is disposed.

In FIG. 5, the thin film transistor T is disposed in the dummy subpixel DSP. A signal is not applied to the thin film transistor T or the thin film transistor T is a dummy thin film transistor that does not operate even when a signal is applied.

The thin film transistor T includes a gate electrode 122 on a first substrate 110, a gate insulating layer 112 on the gate electrode 122, a semiconductor layer 124 on the gate insulating layer 112 over the gate electrode 122 and source and drain electrodes 126 and 127 spaced apart from each other on the semiconductor layer 124.

The first substrate 110 may include a rigid transparent material such as a glass or a flexible material such as a plastic. The plastic may include at least one of polyimide (PI), polymethylmethacrylate (PMMA), polyethylene terephthalate (PET), polyethersulfone (PES) and polycarbonate (PC), and it is not limited thereto.

The gate electrode 122 may include a metallic material. For example, the gate electrode 122 may have a single layer or a multiple layer of one or an alloy of molybdenum (Mo), aluminum (Al), chromium (Cr), gold (Au), titanium (Ti), nickel (Ni), neodymium (Nd) and copper (Cu), and it is not limited thereto.

The gate insulating layer 112 may have a single layer or a multiple layer of an inorganic insulating material such as silicon oxide (SiOx) and silicon nitride (SiNx), and it is not limited thereto.

The semiconductor layer 124 may include an amorphous semiconductor material or a polycrystalline semiconductor material. When the semiconductor layer 124 includes a polycrystalline semiconductor material, the polycrystalline semiconductor material may include low temperature polycrystalline silicon (LTPS), and it is not limited thereto.

The semiconductor layer 124 may include an oxide semiconductor material. For example, the semiconductor layer 124 may include one of indium gallium zinc oxide (IGZO), indium zinc oxide (IZO), indium gallium tin oxide (IGTO) and indium gallium oxide (IGO), and it is not limited thereto. Although not shown, the semiconductor layer 124 may include a channel region at a center thereof and source and drain regions doped with an impurity at both sides thereof.

The source and drain electrodes 126 and 127 may have a single layer and a multiple layer of a metallic material such as chromium (Cr), molybdenum (Mo), tantalum (Ta), copper (Cu), titanium (Ti), aluminum (Al) and aluminum (Al) alloy, and it is not limited thereto. The source and drain electrodes 126 and 127 are connected to the source and drain regions, respectively, of the semiconductor layer 124 through a contact hole in the gate insulating layer 112. (ohmic contact)

The repair line RL is disposed in the touch line area TLA and the dummy pattern area DPA on the first substrate 110. The repair line RL may be referred to as a dummy common line having the same material and the same layer as the common line CL. The repair line RL may be formed of the same metallic material as the gate electrode 122 of the thin film transistor T through the same process as the gate electrode 122 of the thin film transistor T, and it is not limited thereto.

An interlayer insulating layer 114 is disposed on the thin film transistor T in the dummy subpixel DSP and the gate insulating layer 112 in the touch line area TLA and the dummy pattern area DPA. The interlayer insulating layer 114 may have a single layer or a multiple layer of an organic material such as photoacryl or an inorganic material such as silicon nitride (SiNx) and silicon oxide (SiOx). The interlayer insulating layer 114 may have a multiple layer of an organic material layer and an inorganic material layer, and it is not limited thereto.

The touch line TL and the dummy pattern DP are disposed in the touch line area TLA and the dummy pattern area DPA, respectively, on the interlayer insulating layer 114. The touch line TL and the dummy pattern DP may have a single layer or a multiple layer of a metallic material such as chromium (Cr), molybdenum (Mo), tantalum (Ta), copper (Cu), titanium (Ti), aluminum (Al) and aluminum (Al) alloy, and it is not limited thereto.

Although not shown, the touch line TL is connected to the touch electrode of the corresponding touch block TB, and the dummy pattern DP has an electric floating state.

The first and second openings OPEN1 and OPEN2 are formed in the interlayer insulating layer 114 of the touch line area TLA and the dummy pattern area DPA, respectively. The touch line TL and the dummy pattern DP extend to insides of the first and second openings OPEN1 and OPEN2, respectively, on the interlayer insulating layer 114. Since the gate insulating layer 112 is disposed between the touch line TL and the repair line RL and between the dummy pattern DP and the repair line RL, the touch line TL and the dummy pattern DP are electrically insulated from the repair line RL.

When the touch line TL has deterioration such as an electric disconnection or an electric shortage, the touch line TL and the dummy pattern DP are electrically connected to the repair line RL by irradiating a laser beam and the deterioration is repaired. The laser beam is irradiated onto the first and second openings OPEN1 and OPEN2. The touch line TL, the repair line RL and an insulating layer (e.g., gate insulating layer 112) therebetween are melt by the laser beam, and the touch line TL and the repair line RL are electrically connected to each other. The dummy pattern DP, the repair line RL and the insulating layer (e.g., gate insulating layer 112) therebetween are melt by the laser beam, and the dummy pattern DP and the repair line RL are electrically connected to each other.

Since the interlayer insulating layer 114 is removed in the first and second openings OPEN1 and OPEN2, the gate insulating layer 112 is disposed between the touch line TL and the repair line RL in the first opening OPEN1 and between the dummy pattern DP and the repair line RL in the second opening OPEN2.

When a laser beam is irradiated onto the first and second openings OPEN1 and OPEN2 in the repair process, only the gate insulating layer 112 of an inorganic material is melt for an electric connection. As a result, the prompt and accurate repair process is obtained.

In the display device 100 according to some aspects of the present disclosure, since the repair process is performed by forming the first and second openings OPEN1 and OPEN2 in the interlayer insulating layer 114 of the overlap regions of the touch line TL, the dummy pattern DP and the repair line RL, a prompt repair process is obtained.

In FIG. 5, a passivation layer 116 is disposed on the touch line TL and the dummy pattern DP over the interlayer insulating layer 114, and the pixel electrode PXL and the common electrode COM parallel to each other are disposed on the passivation layer 116.

The passivation layer 116 may have a single layer or a multiple layer of an organic material such as photoacryl, and it is not limited thereto. The passivation layer 116 may have a single layer or a multiple layer of an inorganic material such as silicon nitride (SiNx) and silicon oxide (SiOx).

The pixel electrode PXL and the common electrode COM may include a transparent conductive material such as indium tin oxide (ITO) and indium zinc oxide (IZO), and it is not limited thereto. The pixel electrode PXL and the common electrode COM may include the same material as each other through the same process as each other and may include different materials from each other through different processes from each other.

The pixel electrode PXL is electrically connected to the drain electrode 127 of the thin film transistor T through a contact hole in the interlayer insulating layer 114 and the passivation layer 116.

Although the common electrode COM is electrically connected to the common line CL in the subpixel SP, the common electrode COM is not electrically connected to the dummy common line, i.e., the repair line RL in the dummy subpixel DSP.

A black matrix 142 is disposed at a border of the subpixel SP and the dummy subpixel DSP on a second substrate 140, and a color filter layer 144 is disposed on the black matrix 142.

The second substrate 140 may include a rigid transparent material such as a glass, and it is not limited thereto. The second substrate 140 may be a film such as a polystyrene (PS) film, a polyethylene (PE) film, a polyethylene naphthalate (PEN) film and a polyimide (PI) film.

The black matrix 142 may include one of chromium (Cr), chromium oxide (CrOx) and a black resin for blocking a light toward a region where an image is not displayed, and it is not limited thereto. The color filter layer 144 may have red, green and blue color filters including a color resin of red, green and blue colors, respectively, and it is not limited thereto.

A liquid crystal layer 130 is disposed between the first and second substrates 110 and 140 to complete the display device 100.

In the display device 100 according to a first aspect of the present disclosure, the dummy subpixel DSP is disposed in the lower portion of the display area and the dummy pattern DP is disposed to correspond to each of the plurality of touch blocks TB. When the touch line TL has deterioration such as an electric disconnection and an electric shortage, the deterioration of the touch line TL is repaired by welding the dummy pattern DP and the touch block TB.

Further, when the touch line TL and the repair line RL are welded and the repair line RL and the dummy pattern DP are welded for repair, a thickness of the insulating layer between the touch line TL and the repair line RL and between the repair line RL and the dummy pattern DP is reduced or minimized. As a result, the repair process of welding by a laser irradiation is promptly and easily performed.

Figure 6:
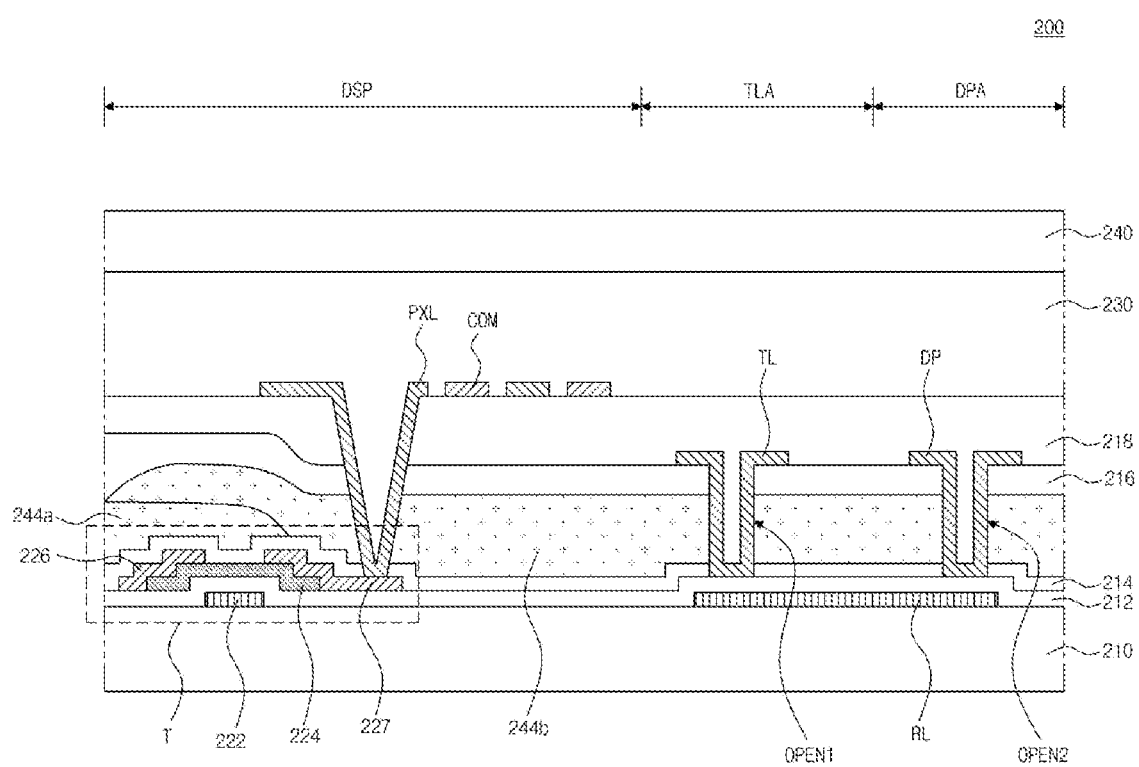
FIG. 6 is a cross-sectional view showing a display device according to some aspects of the present disclosure.

FIG. 6 is a cross-sectional view showing a display device according to some aspects of the present disclosure. A display device 200 can have a color filter on thin film transistor (COT) type where a color filter layer is disposed over a thin film transistor. Illustration on a part the same as that of aspects described above will be omitted.

In FIG. 6, a thin film transistor T is disposed in a dummy subpixel DSP on a first substrate 210. The thin film transistor T includes a gate electrode 222 on the first substrate 210, a gate insulating layer 212 on the gate electrode 222, a semiconductor layer 224 on the gate insulating layer 212 over the gate electrode 222 and source and drain electrodes 226 and 227 spaced apart from each other on the semiconductor layer 224.

A repair line RL is disposed in a touch line area TLA and a dummy pattern area DPA on the first substrate 210. The repair line RL may include the same material as the gate electrode 222 through the same process as the gate electrode 222, and it is not limited thereto.

A first insulating layer 214 may be disposed on the thin film transistor T and the gate insulating layer 212. The first insulating layer 214 prevents deterioration due to reduction of an interface property between the thin film transistor T and a color filter layer and protects the thin film transistor T from a particle or an external impact generated while the color filter layer is formed. The first insulating layer 214 may include an inorganic material such as silicon oxide (SiOx) and silicon nitride (SiNx), and it is not limited thereto.

A color filter layer 244a and 244b is disposed on the first insulating layer 214. The color filter layers 244a and 244b in the adjacent dummy subpixels DSP (and the adjacent subpixels SP) have different colors. The color filter layer 244a and 244b may have one of red, green and blue colors.

The two color filter layers 244a and 244b in the adjacent dummy subpixels DSP overlap each other in a border region of the dummy subpixel DSP (and a non-display area of a border region of the subpixel SP) over the thin film transistor T. The two color filter layers 244a and 244b overlapping each other blocks a light. Since the light toward the non-display area is blocked by the two color filter layers 244a and 244b overlapping each other, an additional black matrix is not required. As a result, a fabrication cost is reduced and a fabrication process is simplified.

A second insulating layer 216 is disposed on the color filter layer 244a and 244b. A touch line TL and a dummy pattern DP are disposed in the touch line area TLA and the dummy pattern area DPA, respectively, on the second insulating layer 216. The second insulating layer 216 may have a single layer or a multiple layer of an organic material such as photoacryl or an inorganic material such as silicon nitride (SiNx) and silicon oxide (SiOx). The second insulating layer 216 may have a multiple layer of an organic material layer and an inorganic material layer, and it is not limited thereto. The touch line TL is electrically connected to a touch electrode of the corresponding touch block TB, and the dummy pattern DP has an electric floating state. The touch line TL and the dummy pattern DP may have a single layer or a multiple layer of a metallic material such as chromium (Cr), molybdenum (Mo), tantalum (Ta), copper (Cu), titanium (Ti), aluminum (Al) and aluminum (Al) alloy, and it is not limited thereto.

A passivation layer 218 is disposed on the touch line TL and the dummy pattern DP over the second insulating layer 216.

First and second openings OPEN1 and OPEN2 are formed in the second insulating layer 216, the color filter layer 244b and the first insulating layer 214 of the touch line area TLA and the dummy pattern area DPA, respectively. The touch line TL and the dummy pattern DP extend to insides of the first and second openings OPEN1 and OPEN2, respectively, on the second insulating layer 216. Since the gate insulating layer 212 is disposed between the touch line TL and the repair line RL and between the dummy pattern DP and the repair line RL, the touch line TL and the dummy pattern DP are electrically insulated from the repair line RL.

In the display device 200 according to a second aspect of the present disclosure, the first and second openings OPEN1 and OPEN2 are formed in the second insulating layer 216, the color filter layer 244b and the first insulating layer 214. When the touch line TL has deterioration such as an electric disconnection or an electric shortage, a laser beam is irradiated onto the touch line TL and the dummy pattern DP in the first and second openings OPEN1 and OPEN2 to melt the touch line TL, the dummy pattern DP and the gate insulating layer 212. As a result, the touch line TL and the dummy pattern DP are electrically connected to the repair line RL, and the touch line TL having the deterioration is repaired.

It is difficult to melt an organic material with a laser beam, and it is easy to melt an inorganic material with a laser beam. Since the inorganic material layer is welded by the laser beam after the first and second openings OPEN1 and OPEN2 are formed to remain the inorganic material layer, the touch line TL having the deterioration is repaired.

The second insulating layer 216, the color filter layer 244b, the first insulating layer 214 and the gate insulating layer 212 are not welded by the laser beam. Instead, only the gate insulating layer 212 of an inorganic material is welded with the laser beam, and each of the touch line TL and the dummy pattern DP is electrically connected to the repair line RL. As a result, the prompt and accurate repair process is obtained.

In a second aspect of FIG. 6, the touch line TL and the dummy pattern DP are disposed on the second insulating layer 216, the first and second openings OPEN1 and OPEN2 are formed in the first insulating layer 212, the color filter layer 244b and the second insulating layer 216, and the touch line TL and dummy pattern DP extend to the first and second openings OPEN1 and OPEN2, respectively. In another aspect, the first and second openings OPEN1 and OPEN2 may be formed in the color filter layer 244b and the second insulating layer 216, the touch line TL and the dummy pattern DP may extend to the first and second openings OPEN1 and OPEN2, respectively, and an electric contact may be obtained by welding the gate insulating layer 212 and the first insulating layer 214. In another aspect, the first and second openings OPEN1 and OPEN2 may be formed in the first insulating layer 214 and the color filter layer 244b, the touch line TL and the dummy pattern DP may extend to the first and second openings OPEN1 and OPEN2, respectively, and an electric contact may be obtained by welding the gate insulating layer 212 and the second insulating layer 216.

A second substrate 240) is disposed over the first substrate 210, and a liquid crystal layer 230 is disposed between the first and second substrates 210 and 240.

Although the display device is a liquid crystal display (LCD) device in first and second embodiments, the display device is not limited thereto. For example, the display device may be various display device such as an organic light emitting diode (OLED) display device, an electrophoretic display device, a quantum dot display device and a micro light emitting diode (LED) display device.

Consequently, in the display device according to an aspect of the present disclosure, when a touch deterioration such as an electric disconnection or an electric shortage of a touch line occurs, the touch deterioration is repaired due to a new detour path.

Specifically, when the touch deterioration occurs after a dummy pattern is formed without change of a structure of the touch line or a touch block, the touch deterioration is repaired by electrically connecting the touch line and the dummy pattern. As a result, a repair process is simplified and a cost of the repair process is reduced or minimized.

Therefore, reduction of a product energy due to optimization of a fabrication process and reduction of a regulated material due to disuse of a display device are obtained.

It will be apparent to those skilled in the art that various modifications and variation may be made in the present disclosure without departing from the scope of the disclosure. Thus, it is intended that the present disclosure cover the modifications and variations of this disclosure provided they come within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A display device, comprising:
   a display panel including a plurality of touch blocks each having a touch electrode;
   a dummy region at one side of the display panel;
   a plurality of touch lines connected to the plurality of touch blocks and configured to apply a corresponding touch signal to each of the plurality of touch blocks;
   a repair line in the dummy region; and
   a dummy pattern in the display panel,
   wherein an opening is disposed in at least one region of an overlap region of one of the plurality of touch lines and the repair line, an overlap region of the repair line and the dummy pattern, and an overlap region of the dummy pattern and one of the plurality of touch blocks, and
   an electric contact is disposed in the opening.

2. The display device of claim 1, wherein at least one of the plurality of touch lines is repaired by an electric contact between one of the plurality of touch lines and the repair line, between the repair line and the dummy pattern, and between the dummy pattern and one of the plurality of touch blocks.

3. The display device of claim 1, wherein the dummy pattern has an electric floating state.

4. The display device of claim 1, wherein the display panel comprises:
   first and second substrates;
   a thin film transistor on the first substrate, the thin film transistor having a gate insulating layer on the dummy pattern;
   a first insulating layer on the thin film transistor;
   a second insulating layer on the first insulating layer;
   a pixel electrode and a common electrode on the second insulating layer; and
   a liquid crystal layer between the first and second substrates.

5. The display device of claim 4, wherein the plurality of touch lines and the dummy pattern are on the first insulating layer.

6. The display device of claim 5, wherein the opening is in the first insulating layer, and
   the plurality of touch lines and the dummy pattern extend to an inside of the opening.

7. The display device of claim 6, wherein the electric contact is formed by melting the gate insulating layer.

8. The display device of claim 4, wherein the display panel further comprises:
   a black matrix on the second substrate; and
   a color filter layer on the black matrix.

9. The display device of claim 1, wherein the display panel comprises:
   first and second substrates;
   a thin film transistor on the first substrate, the thin film transistor having a gate insulating layer on the dummy pattern;
   a first insulating layer on the thin film transistor;
   a color filter layer on the thin film transistor;
   a second insulating layer on the color filter layer;
   a third insulating layer on the second insulating layer;
   a pixel electrode and a common electrode on the third insulating layer; and
   a liquid crystal layer between the first and second substrates.

10. The display device of claim 9, wherein the plurality of touch lines and the dummy pattern are on the second insulating layer.

11. The display device of claim 10, wherein the opening is in the first insulating layer, the color filter layer and the second insulating layer, and the plurality of touch lines and the dummy pattern extend to an inside of the opening.

12. The display device of claim 11, wherein the electric contact is formed by melting the gate insulating layer.

13. The display device of claim 11, wherein the opening is in the color filter layer and the second insulating layer, and
   the plurality of touch lines and the dummy pattern extend to an inside of the opening.

14. The display device of claim 13, wherein the electric contact is formed by melting the gate insulating layer and the first insulating layer.

15. The display device of claim 10, wherein the opening is disposed in the first insulating layer and the color filter layer, and
   the plurality of touch lines and the dummy pattern extend to an inside of the opening.

16. The display device of claim 15, wherein the electric contact is formed by melting the gate insulating layer and the second insulating layer.

17. The display device of claim 9, wherein the color filter layer includes red, green and blue color filters.

18. The display device of claim 17, wherein two adjacent ones of the red, green and blue color filters overlap each other in a non-display area.

* * * * *